United States Patent [19]

Boulard et al.

[11] Patent Number: 4,628,502
[45] Date of Patent: Dec. 9, 1986

[54] DATA AND SIGNALING TIME SLOT TRANSFER AND PROCESSING SYSTEM FOR A SET OF MULTIPLEX LINES

[75] Inventors: Pierre Boulard, Lannion; Roger Gouriou, Louannec, both of France

[73] Assignee: Compagnie Industrielle des Telecommunications Cit-Alcatel, Paris, France

[21] Appl. No.: 649,406

[22] Filed: Sep. 11, 1984

[30] Foreign Application Priority Data

Sep. 14, 1983 [FR] France ............................. 83 14619

[51] Int. Cl.[4] .......................... H04J 3/16; H04J 3/02; H04Q 11/04
[52] U.S. Cl. ........................................ 370/84; 370/85
[58] Field of Search .................. 370/84, 58, 59, 85, 370/63

[56] References Cited

U.S. PATENT DOCUMENTS

| 3,397,728 | 12/1976 | Duquesne et al. ................. 152/158 |
| 3,935,391 | 1/1976 | Weir et al. ............................ 370/84 |
| 4,129,756 | 12/1978 | Depouilly et al. ............ 179/175.2 R |
| 4,206,322 | 6/1980 | Lurtz ..................................... 370/84 |
| 4,402,078 | 8/1983 | Athenes et al. ....................... 370/66 |
| 4,536,872 | 8/1985 | Lahti .................................... 370/84 |

FOREIGN PATENT DOCUMENTS

A-0682256 8/1983 European Pat. Off. .

OTHER PUBLICATIONS

Review of the Electrical Communication Laboratories, col. 28, Nos. 5–6, May–Jun. 1980, Tokyo (JP), T. Uchiyama et al; "Digital Data Switching Control System", pp. 338–349, 346–347, paragraph 1.1.

IEEE Communications Magazine, vol. 21, No. 3, May 1983, New York (JS), M. Kajiwara: "Trends in Digital Switching System Architectures", pp. 47–52, 49, paragraph 3.

Primary Examiner—Douglas W. Olms
Assistant Examiner—Frank M. Scutch, III
Attorney, Agent, or Firm—Sughrue, Mion, Zinn, Macpeak, and Seas

[57] ABSTRACT

A data and signaling time slot transfer and processing system for a set of multiplex lines comprises a switching matrix. Its inputs are connected to n multiplex lines by switching matrix input lines. There are m serial communication controllers each connected to an input register and an output register. The outputs of the switching matrix are connected by m output lines to the input registers. Its inputs are connected by m input lines to the output registers. The matrix outputs are also connected by n switching matrix output lines to multiplex lines. A composite clock signal is applied to all the input and output registers. A further clock signal is applied to the controllers, for the purpose of changing the information reception and transmission bit rates, the information having a bit rate of 64 kbit/s and the multiplex lines functioning at 2.048 Mbit/s.

5 Claims, 3 Drawing Figures

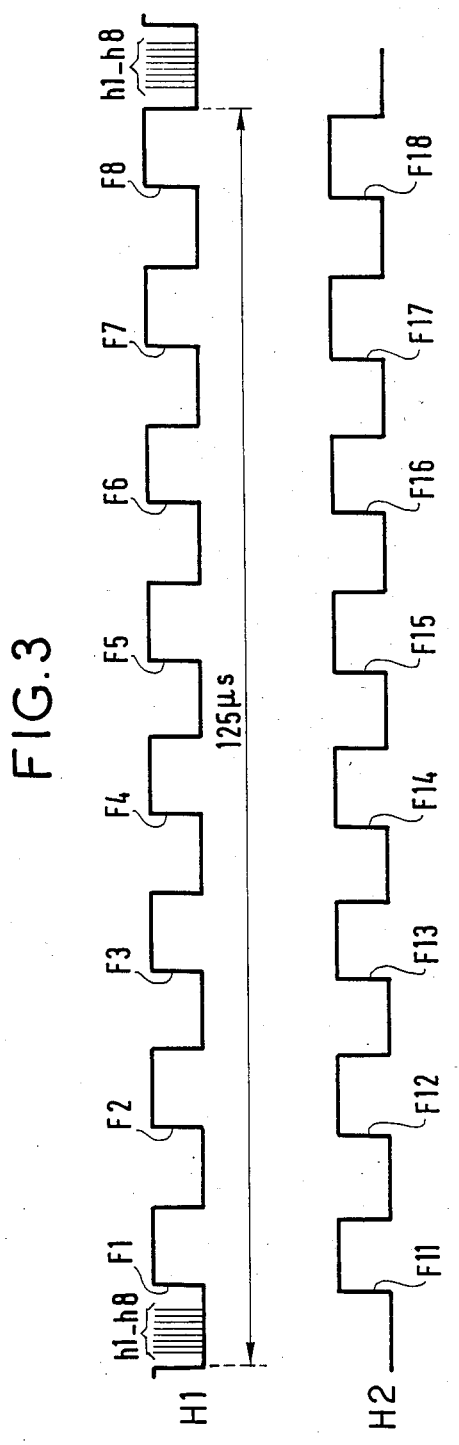

DATA AND SIGNALING TIME SLOT TRANSFER AND PROCESSING SYSTEM FOR A SET OF MULTIPLEX LINES

BACKGROUND OF THE INVENTION

1. Field of the Invention

The invention concerns a data and signaling time slot transfer and processing system for a set of multiplex lines.

2. Description of the Prior Art

In modern telecommunication networks, information is transmitted on a common multiplex line in the form of coded pulses contained in the time slots of a frame. Conventionally, a frame has a duration of 125 microseconds and is divided into 32 intervals referred to as time slots. The multiplex line functions at 2.048 MHz with each channel in the frame having a flow of 64 kbits/s. Certain channels contain signals in the form of a message or of particular data, which it is necessary to extract and to process at certain locations of the telecommunications network. Likewise, at these locations, it is necessary to insert, on certain channels of the multiplex line, signals in the form of messages or of particular data. These particular data can for example be switched messages in the form of bundles in accordance with CCITT Notice X25.

This processing is carried out either in the digital exchange to which the multiplex lines are connected or in a remote line unit connected to the digital exchange by multiplex lines. The processing is carried out in a digital control unit located either in the digital exchange or in the remote line unit. In a remote line unit, for example, the digital control unit controls the operation of the remote line unit as a whole and the links between the latter and analog or digital subscriber lines on the one hand and with the digital exchange on the other hand.

The processing for a set of n multiplex lines is carried out by serial communication controllers which format and assemble the so-called HDLC (High Data Level Control) frames. A serial communication controllers is assigned to a time slot of a multiplex line for the entire duration of an exchange in this time slot. The controllers may then be assigned to another time slot of the same multiplex line or to any time slot of another multiplex line from the set of multiplex lines.

It is therefore necessary to extract the time slots from each multiplex line to route them to a controllers and to retransmit them after processing by the controllers in a time slot of a multiplex line. One solution to the problem of extracting and injecting a time slot from and into a multiplex line is described in an article entitled "Elé ments de multiplexage MIC 30 voies TNE de la deuxième génération" in the periodical Câbles et Transmission 32e A, No 2 April 1978 pages 152 to 191. This solution employs serial and parallel registers which may be associated with a serial communication controlles. If there are n multiplex lines and m controllers, each controllers being assignable to any time slot of any multiplex line, it is also possible to provide receive and transmit selection units for each controllers, a serial communication controllers and the set of units associated with it constituting an individual subsystem.

The associated units essentially comprise: an eight-bit register which receives the number of the multiplex line to be selected and the number of the selected time slot on this multiplex line; a multiplexer for selecting one of n multiplex lines and for routing the selected multiplex line to the controler; a demultiplexer providing for transmission to the controllers on one of n multiplex lines, the demultiplexer being controled in synchronism with the multiplexer; two eight-bit registers for transfering the content of the selected time slot to the controllers, a first register being loaded at the 2.048 Mbit/s bit rate during the time corresponding to that of the time slot and its contents then being transfered in parallel into the second register the content of which is then transfered serially to the controllers at the regular 64 kbit/s bit rate; and two eight-bit registers for serial transmission from the controllers to a multiplex line, the first register receiving information from the controllers at the 64 kbit/s bit rate and the second register receiving the information from the first register in parallel and transmitting it serially at the 2.048 Mbit/s bit rate. A clock signal generator provides the signals necessary to operation of the individual subsystems.

Thus the individual subsystems require a relatively large number of units, which increases their cost and the space required for their installation.

The object of the invention is to reduce the cost and the bulk of a data and signaling time slot transfer and processing system for a set of multiplex lines.

SUMMARY OF THE INVENTION

The invention consists in a data and signaling time slot transfer and processing system for a set of n first 2.048 Mbit/s multiplex lines with the information in each data or signaling time slot having a bit rate of 64 kbit/s, comprising m serial communication controllers, a clock, input and output registers associated with said controllers, said input registers being adapted to effect a bit rate change from 2.048 Mbit/s to 64 kbit/s and said output registers being adapted to effect a bit rate change from 64 kbit/s to 2.048 Mbit/s, a switching matrix effecting space-division switching and time-division switching and adapted to be connected on its input side to said m first multiplex lines by switching matrix input lines and to m input lines and on its output side to a set of n second multiplex lines by switching matrix output lines and to m output lines, wherein each controllers is connected to an input register and an output register, each input register has its output connected to said switching matrix by an output line, each output register has its input connected to said switching matrix by an input line, said clock has a first output adapted to supply a composite clock signal to each input and output register and a second output adapted to supply a clock signal to each controllers, said clock is adapted to supply clock signals to said switching matrix, any time slot of said first multiplex lines is connected to a fixed time slot of any output line, said output line fixed time slot is the same for all output lines, the contents of said output registers are transferred into a fixed time slot of said input lines, said input line fixed time slot is the same for all input lines, a fixed time slot of said input line is connected to any time slot of any of said switching matrix output lines, and said input and output line fixed time slots are the same.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 3 is a timing diagram for the clock signals used in the system of FIG. 2.

DESCRIPTION OF THE PREFERRED EMBODIMENT

Figure 1:
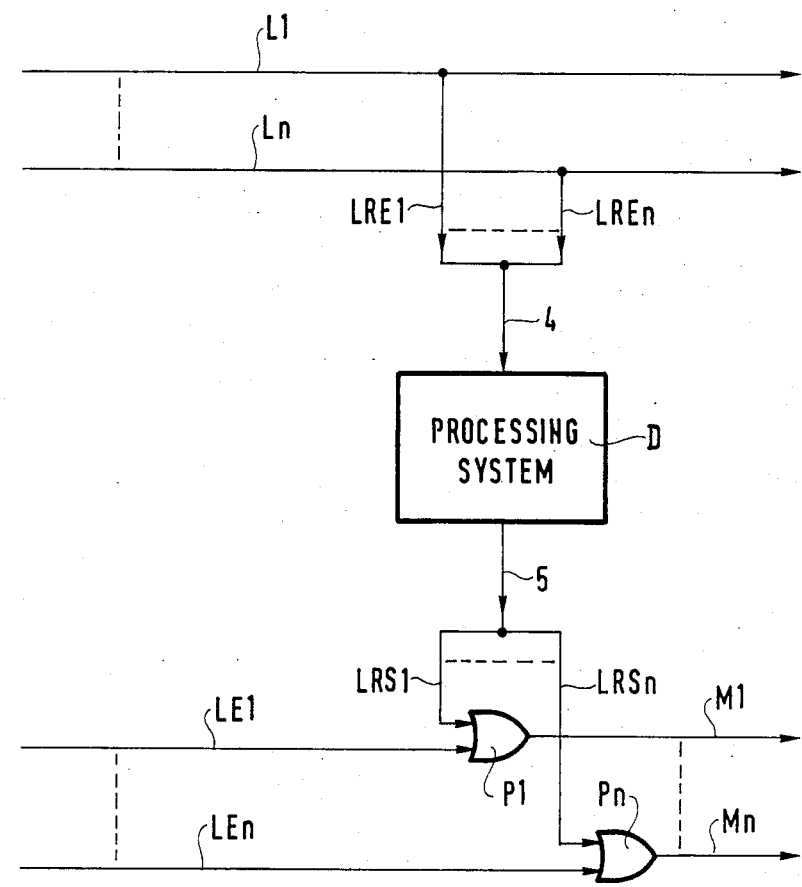
FIG. 1 shows the connection of a transfer and processing system in accordance with the invention to multiplex lines.

In FIG. 1, a transfer and processing system D in accordance with the invention has its input connected to n multiplex lines L1 to Ln through the intermediary of an input link 4 consisting of switching matrix input lines LRE1 to LREn connected to the multiplex lines L1 to Ln, respectively. Its output is connected to the inputs of n OR gates P1 to Pn by an output link 5 consisting of n switching matrix output lines LRS1 to LRSn. The OR gates P1 to Pn also have inputs connected to n multiplex lines LE1 to LEn, respectively. The outputs of the OR gates P1 to Pn are connected to n multiplex lines M1 to Mn, respectively.

The transfer and processing system D provides for the extraction of data and signaling time slots from each of the multiplex lines L1 to Ln of which the other time slots are routed to local circuits processing these other time slots. These local circuits comprise, for example, a digital switching network and digital-to-analog converters.

Figure 2:
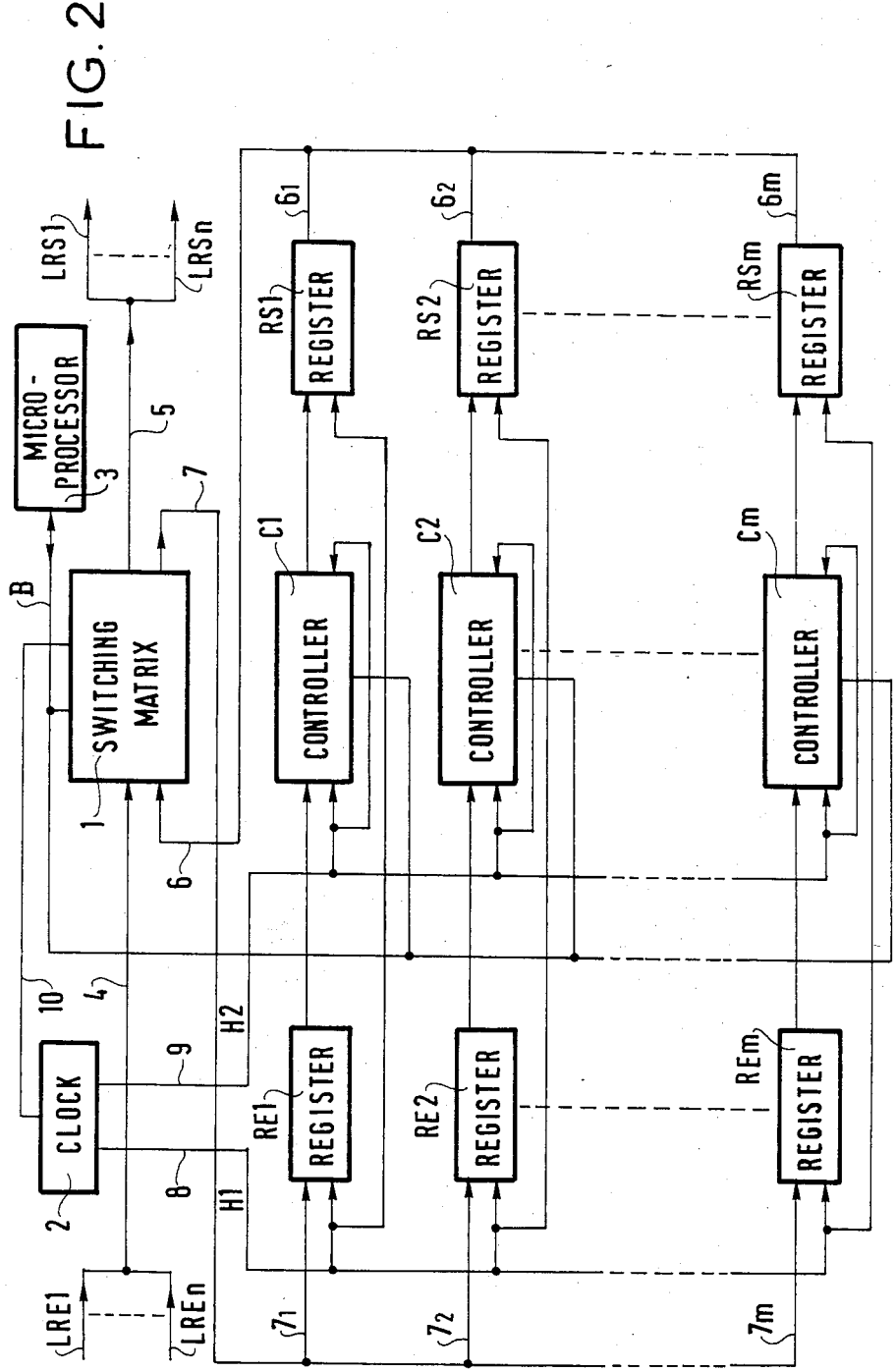
FIG. 2 shows the transfer and processing system of FIG. 1.

FIG. 2 shows the transfer and processing system D from FIG. 1, in which 1 is a switching matrix, C1, C2, ..., Cm are serial communication controllers, RE1, RE2, ..., REm are input registers, RS1, RS2, ... RSm are output registers, 2 is a clock and 3 is a microprocessor connected by a bus B to the switching matrix and to the controllers. The microprocessor delivers information needed to extract the time slots from first multiplex lines L1 to Ln, for injection into second multiplex lines M1 to Mn and for the operation of the m controllers.

The input of the switching matrix 1 is connected to an input link 4 consisting of the n switching matrix input lines LRE1 to LREn and to an input link consisting of m input lines 61, 62, ..., 6m. The output of the matrix is connected to an output link 5 consisting of n switching matrix output lines LRS1 to LRSn and to an output link 7 consisting of m output lines 71, 72, ..., 7m. The switching matrix 1 sets up space and time (time slot interchange) connections between the input and output links. Thus the switching matrix is a switch well known to those skilled in this art and having n+m inputs and n+m outputs.

The clock 2 delivers a composite clock signal H1 on a line 8 connected to the clock input on each of the input and output registers RE1 to REm and RF1 to RFm. The composite clock signal H1 provides for the 2.048 Mbit/s/64 kbit/s bit rate change by loading the input registers at an instantaneous bit rate of 2.048 Mbit/s and transferring from the latter at an average bit rate of 64 kbit/s and by loading the output registers at an average bit rate of 64 kbit/s and transferring from the latter at an instantaneous bit rate of 2.048 Mbit/s. FIG. 3 shows the composite clock signal H1 consisting of a 2.048 Mbit/s clock signal and a 64 kbit/s clock signal comprising, in a 125 microsecond time interval, eight pulses of which the first brackets eight pulses of the 2.048 Mbit/s clock signal. The clock 2 also delivers on a line 9 a 64 kbit/s clock signal H2 which controls the controllers C1 to Cm in receive and transmit modes. This clock signal H2, shown in FIG. 3, has a slight phase lead over the 64 kbit/s clock signal of the composite clock signal H1 to allow for timing constraints associated with the switching matrix on the one hand and the controllers on the other hand.

The clock 2 also delivers, over a link 10, the clock signals necessary for operation of the switching matrix 1. These signals comprise: an internal sampling signal dependent on the matrix used, being at 4.096 Mbit/s for a switching matrix having eight inputs and eight outputs (n+m=8) and a synchronization signal for the m+n lines connected to the matrix inputs and outputs, with a period of 125 microseconds.

The input registers RE1, RE2, ..., REm have their inputs connected to the output lines 71, 72, ..., 7m, respectively, and their outputs connected to the serial communication controllers C1 to Cn, respectively. The inputs of the output registers RS1, RS2, ..., RSn are connected to the serial communication controllers C1 to Cn, respectively. Their outputs are connected to input lines 61 to 6m, respectively. The switching matrix 1 and each of the serial communication controllers C1 to Cn are connected to the bus B which is itself connected to the microprocessor.

The first multiplex lines L1 to Ln (FIG. 1) each carry information contained in the 32 time slots of a frame. The data to be processed and contained in the time slots of the frame must be processed independently of the other time slots of the frame which are routed to local circuits which process the other time slots. Under the control of the microprocessor 3, the switching matrix 1 provides for routing any time slot of any of the first multiplex lines L1 to Ln to which it is connected via the switching matrix input lines LRE1 to LREn to any of the output lines 71, 72, ..., 7m constituting the output link 7. Similarly, the switching matrix provides for routing any time slot of any of the input lines 61 to 6m to any of the switching matrix output lines LRS1 to LRSn. The time slots to be processed of the first multiplex lines L1 to Ln are transfered into fixed and identical time slots of the output lines 71 to 7m. Similarly, the information from the output registers RS1 to RSm is sent over the input lines 61 to 6m in fixed and identical time slots which are the same (that is have the same numbers) as those of the output lines 71 to 7m. In this way the composite clock signal H1 is common to all input and output registers. The fixed time slots of the input lines 61 to 6m are then transferred into any time slots of the switching matrix output lines LRS1 to LRSn.

The information present on the output lines 71 to 7m is entered serially into the input registers RE1 to REm under the control of the pulses H1 to H8 of the 2.048 mbit/s clock signal of the composite clock signal H1. The controllers C1 to Cm strobe the information contained in the input registers on the rising edges F11 to F18 of the 64 kbit/s clock signal H2, whereas the serial shifts in the input register are effected on the rising edges F1 to F8 of the 64 kbit/s clock signal of the composite clock signal H1. On the transmit side, the information is available at the output of the controllers C1 to Cm on the rising edges F11 to F18 of the clock signal H2. It is loaded serially into the output registers RS1 to RSm on the rising edges F1 to F8 of the 64 kbit/s signal of the composite clock signal H1 and then transferred serially onto the input lines 61 to 6m by pulses H1 to H8 of the 2.048 Mbit/s clock signal of the composite clock signal H1.

The switching matrix 1 may be, for example, of the SM233 type marketed by SIEMENS and the serial communication controllers C1 to Cm may be, for example, of the 8530 type marketed by AMD. In the case of four multiplex lines L1, L2, L3, L4 and M1, M2, M3, M4 it is possible to implement the switching matrix 1, four controllers C1 to C4, input registers RE1 to RE4, output registers RS1 to RS4 and the microprocessor 3 on a single printed circuit card.

By virtue of the switching matrix, the transfer and processing system in accordance with the invention provides for transmit-receive loopback, that is to say either the direct looping back of a controllers or the looping back of one controllers to another, the information sent by one controllers being received by another controllers and vice versa. The direct controllers loopback facility provides for testing the controllers in the event of a malfunction. The crossover controllers loopback facility provides for dialog between controllers, such dialog being employed during commissioning for debugging the hardware and software of the controlers and higher level devices using them. For example, a first controllers fulfils its normal function and a second controllers simulates a remote station with which the first controllers dialogs.

It is also possible to route information from a controllers via the switching network 1 to all or some only of the second multiplex lines M1 to Mn simultaneously. This facility for synchronously accessing the stations connected to the multiplex lines is of benefit in applications such as, for example, reinitialization control of interchange channels of multiplex lines and provision of synchronization timing pulses.

It will be understood that various changes in the details, materials and arrangements of parts, which have been herein described as illustrated in order to explain the nature of the invention, may be made by those skilled in the art in the principle and the scope of the invention as expressed in the appended claims.

We claim:

1. A data and signaling time slot transfer and processing system for a set of n first 2.048 Mbit/s multiplex lines with the information in each data or signaling time slot having a bit rate of 64 kbit/s, comprising m serial communication controllers, a clock, input and output registers associated with said controllers, said input registers being adapted to effect a bit rate change from 2.048 Mbit/s to 64 kbit/s and said output registers being adapted to effect a bit rate change from 64 kbit/s to 2.048 Mbit/s, a switching matrix effecting space-division switching and time-division switching and adapted to be connected on its input side to said m first multiplex lines by switching matrix input lines and to m input lines and on its output side to a set of n second multiplex lines by switching matrix output lines and to m output lines, wherein each controllers is connected to an input register and an output register, each input register has its output connected to said switching matrix by an output line, each output register has its input connected to said switching matrix by an input line, said clock has a first output adapted to supply a composite clock signal to each input and output register and a second output adapted to supply a clock signal to each controllers, said clock is adapted to supply clock signals to said switching matrix, any time slot of said first multiplex lines is connected to a fixed time slot of any output line, said output line fixed time slot is the same for all output lines, the contents of said output registers are transferred into a fixed time slot of said input lines, said input line fixed time slot is the same for all input lines, a fixed time slot of said input line is connected to any time slot of any of said switching matrix output lines, and said input and output line fixed time slots are the same.

2. A system according to claim 1, wherein said composite clock signal comprises a 2.048 Mbit/s clock signal and 64 kbit/s clock signal comprising in a 125 microsecond time slot eight pulses of which the first brackets eight pulses of the 2.048 Mbit/s signal and wherein said clock signal supplied to each controller is a 64 kbit/s signal.

3. A system according to claim 1, comprising a microprocessor adapted to control said switching matrix and said serial communication controllers and wherein said switching matrix causes said microprocessor to distribute a message sent by one of said controllers to all or some only of said switching matrix output lines.

4. A system according to claim 1, comprising a microprocessor adapted to control said switching matrix and said serial communication controllers and wherein, under the control of said microprocessor, any two of said controllers may be connected to one another via said switching matrix in order to carry out tests on one of said two controllers or to permit dialog between said two controllers.

5. A system according to claim 1, wherein each of said output registers has its output coupled to said input side of said switching matrix.

* * * * *